UNITED STATES PATENT OFFICE.

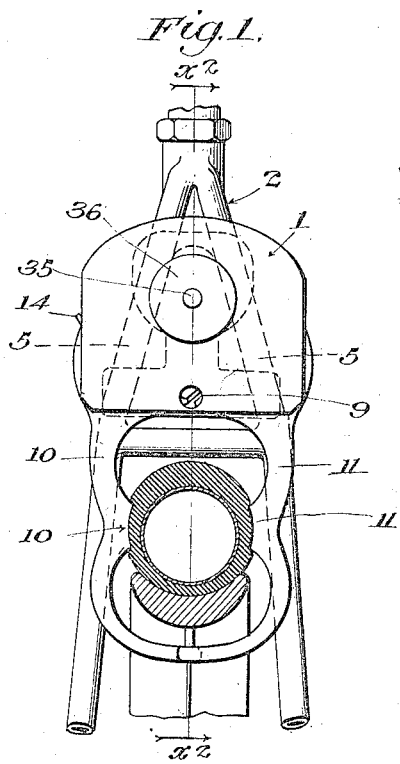
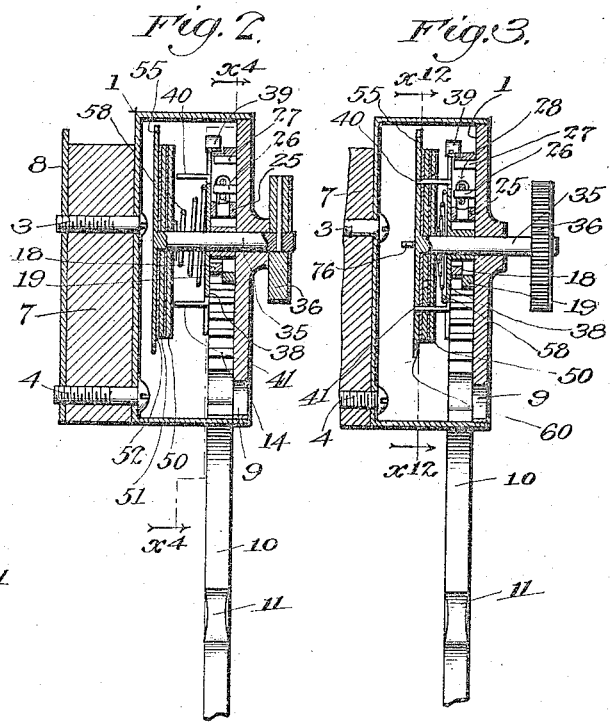
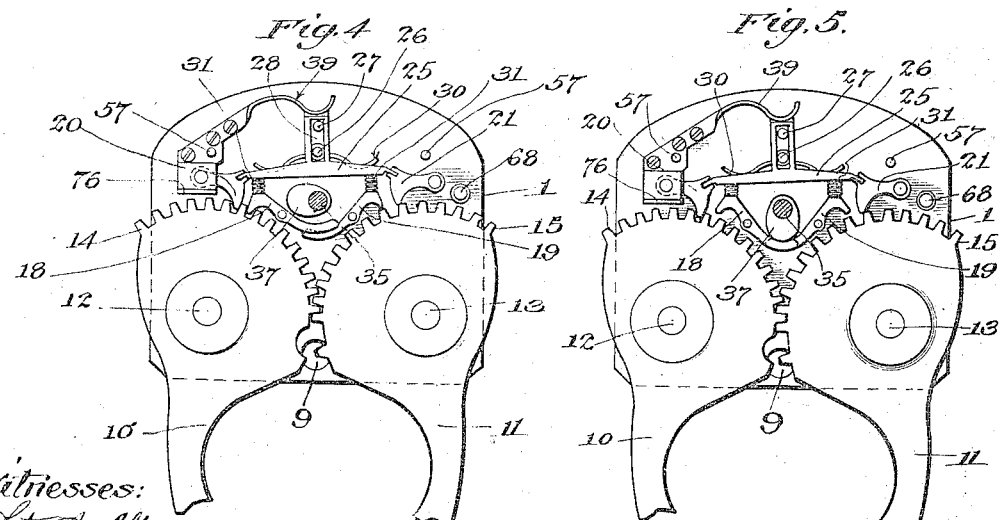

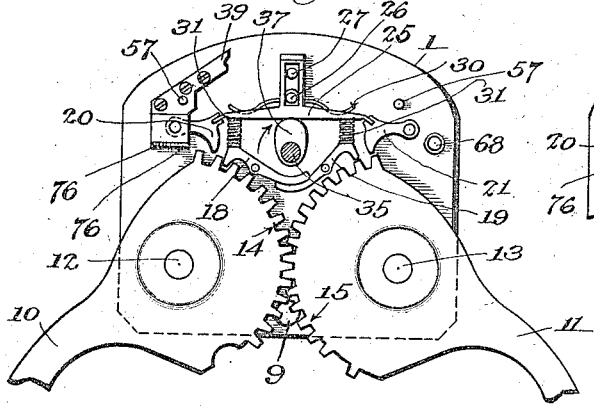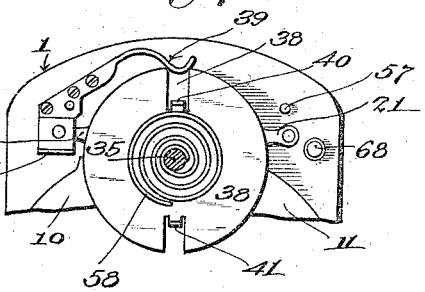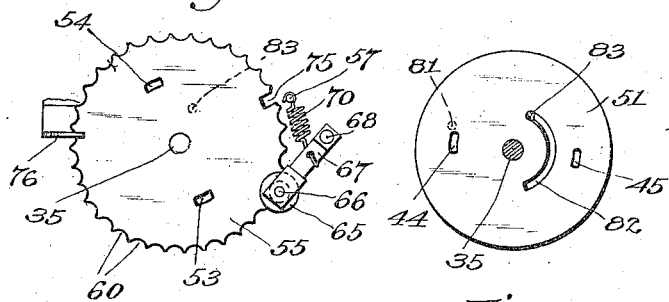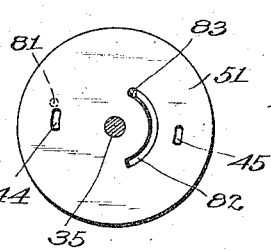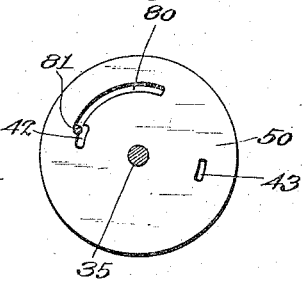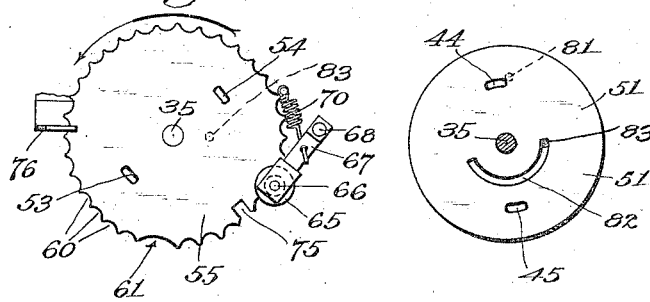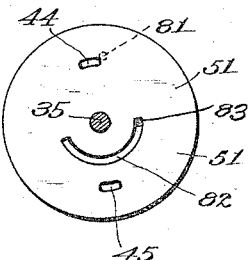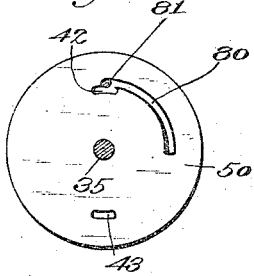

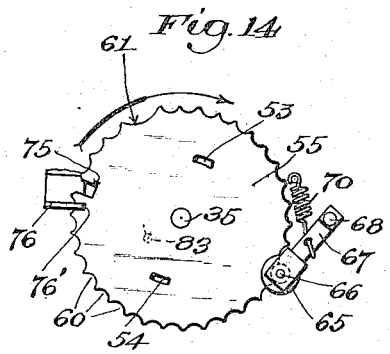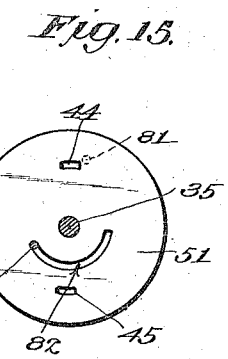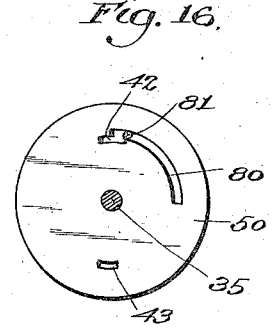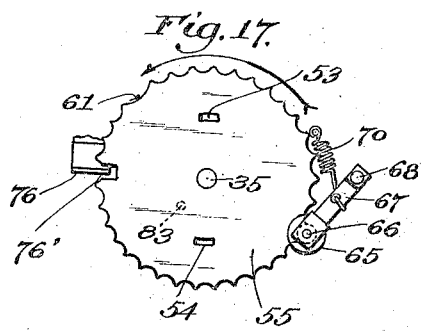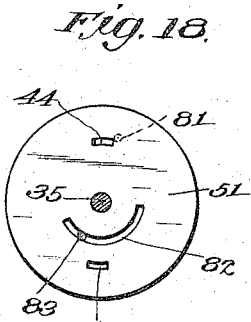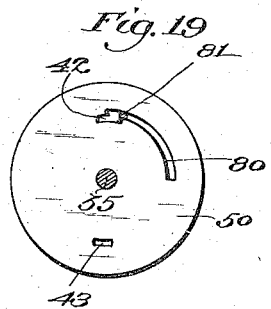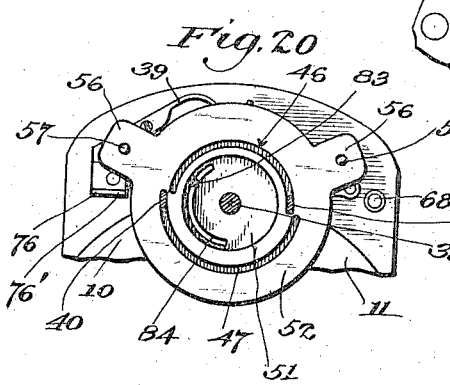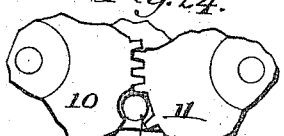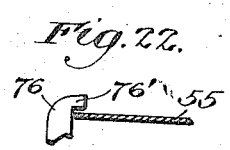

PAUL PALÉ, OF LOS ANGELES, CALIFORNIA.

PERMUTATION-LOCK.

1,242,848.  Specification of Letters Patent.  Patented Oct. 9, 1917.

Application filed April 6, 1914.  Serial No. 829,865.

*To all whom it may concern:*

Be it known that I, PAUL PALÉ, a citizen of the United States, residing at Los Angeles, in the county of Los Angeles and State of California, have invented a new and useful Permutation-Lock, of which the following is a specification.

This invention relates to locks.

The principal object of this invention is to provide a combination lock so constructed that the correct unlocking positions of the combination elements cannot possibly be ascertained by hearing or feeling alone, but must be dependent on perfect knowledge of the combination numbers employed.

Another object is to provide locking elements arranged so that they may be locked in a variety of positions, for instance, closed, open and intermediate positions.

Another object is to provide a lock of this type which is adapted to be secured in position on a bicycle or other vehicle, and to remain thereon when not in use, so that it will always be ready for use.

Another object is to provide a lock the removal of which from its support is controlled by the position of the locking element of the lock.

Another object is to provide an improved combination lock, the combination of which is determined by the sense of touch.

Other objects will appear from the following description:

Referring to the drawings:

Figure 1 is a view showing the lock applied to the rear upright frame member of a bicycle and locking the rear wheel of the bicycle against rotation.

Fig. 2 is a vertical sectional view taken on line $x^2$—$x^2$, Fig. 1.

Fig. 3 is a view similar to Fig. 2, showing the parts in position ready to unlock the lock.

Fig. 4 is a sectional view taken on line $x^4$—$x^4$, of Fig. 2, showing the parts of the lock in locking position.

Fig. 5 is a view similar to Fig. 4, showing the locking arms unlocked, so that they may be spread apart to free the wheel.

Fig. 6 is a view similar to Fig. 4, showing the locking arms unlocked, so that they may be brought together in locking position.

Fig. 7 is a view showing how the lock operating cam is maintained out of operation while the locking arms are locked.

Figs. 8, 9 and 10 are views of the combination locking disks shown in their initial unlocking position.

Figs. 11, 12 and 13 are views of the locking disks showing the index locking disk as having been turned 27 units to the right (which is the first number in the combination of the lock) and one of the other locking disks as having been brought into unlocking position.

Figs. 14, 15 and 16 are views of the locking disks showing the index locking disk turned 14 units to the left (which is the next number in the combination of the lock), and two of the other disks as having been brought into unlocking position.

Figs. 17, 18 and 19 are views of the locking disks showing the index locking disk as having been turned 1 unit to the right, (which is the last number in the combination of the lock), and all of the disks as having been brought into unlocking position.

Figs. 20 and 21 are sectional views taken on line $x^{12}$—$x^{12}$, of Fig. 3, showing the friction element of the lock combination disks, and the means for arresting the lock in unlocked position.

Fig. 22 is a view of the index disk and the lug at the periphery thereof, which coacts with the disk.

Fig. 23 is a view of the index disk and the roller which engages said disk.

Fig. 24 is a fragmentary view illustrating certain parts of the lock in such position as to permit removal of the lock from its support.

The various operating parts of the lock are inclosed within a casing or supporting means 1, which casing as shown in Fig. 1 of the drawing is placed against the rear frame upright 2 of the bicycle frame. Screws 3 and 4 project from inside the casing 1 and project forwardly of the bicycle between the side members 5 of the bicycle rear frame upright 2 and through a block 7 which fits tightly between said side members. The screws 3 and 4 screw into a plate 8 which engages the front faces of the side members 5 whereby the lock is secured in position on the rear upright of the bicycle frame. The screw 3 is stationary, while the screw 4 is adapted to be turned to be disengaged from the plate 8. The rear wall of the casing 1 is provided with an opening 9 through which a screw driver may be inserted under certain conditions hereinafter described to turn screw 4. The plate 8 is disengaged from the screw 3 by unscrewing the plate therefrom. A locking element is provided and comprises a pair of locking arms 10 and 11 which are fulcrumed within and to the casing at 12 and 13 respectively, the extremities of said arms being adapted to rest adjacent the rim of the vehicle wheel and to engage the spokes of the wheel and lock the wheel against turning. The arms are also provided with lugs 10' and 11' adapted to grip the tire of the vehicle wheel when the arms are locked in locking position, which serve as an auxiliary locking element for the vehicle wheel. When the arms 10 and 11 comprising the locking element are engaged with and hold the wheel against rotation the locking element is in locking position. A toothed segment 14 is provided on arm 10 and a tooth segment 15 is provided on arm 11, the teeth of which segments mesh with each other so that said arms are moved inwardly and outwardly in unison with each other. Said segments cover the opening 9 under certain conditions hereinafter described, so that a screw driver cannot be inserted through said hole to turn the screw to remove the lock from its support. There is provided means to lock the arms 10 and 11 in locking position which consists of locking pawls 18 and 19. These pawls are pivoted upon the casing 1 and alternately engage the teeth of the segments 14 and 15. The arms are held against being spread apart by pawls 18 and 19. There is also provided means to lock the locking element, that is, arms 10 and 11 in unlocking position. These means comprise pawls 20 and 21 which are pivoted to the casing 1 and respectively engage the teeth of the segments 14 and 15.

From the foregoing it is clear that the arms 10 and 11 can be locked in a variety of positions, in closed, open and numerous intermediate positions, so that the element or elements capable of being held by the arms may be of varying sizes and so that said arms may be held against movement toward and away from one another.

The pawls 20 and 21 are engaged by the ends of a foot 25 mounted upon pins 26 and 27 which project from the casing through a slot 28 in said foot, and a spring 30 which is coiled about pin 26 presses against the foot to cause the foot to hold the pawls 20 and 21 in engagement with the teeth of the segments. Springs 31 resting between the foot 25 and the pawls 18 and 19 maintain said pawls also in engagement with the teeth of said segments. Journaled in the casing 1 and projecting outwardly therefrom is a stud 35, on the outer end of which is a hand wheel 36. A cam or unlocking member 37 and cam disk 38 fixed to said cam are loosely mounted upon said stud within the casing, so that the cam rests between the foot 25 and pawls 18 and 19 and the cam disk rests over the same. The cam disk is provided with a notch 38' which is engaged by spring finger 39 to hold the cam 37 out of engagement with the foot 25 and pawls 18 and 19. The cam disk 38 and cam or unlocking member 37 are fixed to one another and loosely mounted upon the stud 35, the movement of the cam and cam disk being effected by the spring 58. When the finger 39 engages in the notch 38' in the disk 38, the cam 37 has moved into and is held in the position shown in Fig. 4 of the drawings, free from engagement with the foot 25 and pawls 18 and 19. Lugs 40 and 41 project from the cam disk 38 and are adapted when the combination of the lock is established, to be projected through slots 42 and 43, 44 and 45, in disks 50 and 51 respectively, which are loosely mounted upon said stud, and through slots 46 and 47 in a friction element 52 and slots 53 and 54 in an index disk 55, which disk is secured to the end of the stud. The cam disk 38 and lugs 40 and 41 and the disk 55 and slots 53 and 54 form a clutch which clutches the cam 37 to stud 35 when the combination of the lock is established and the lugs 40 and 41 are projected through slots 53 and 54. The lugs 40 and 41 may be located at different distances from the center of the stud, and the slots 42, 44, 46, and 53 may be located so as to register only with lug 40 and the slots 43, 45, 47, and 54 may be located so as to register only with lug 41, so that there will be only one possible way in which all of the slots and the lugs may be brought into registration. Lugs 56 are provided on the element 52 which are slidably mounted on pins 57 projecting from the casing 1, whereby said element is prevented from turning.

A spring 58 rests between the cam disk 38 and disk 50 and tends to force the disks 50 and 51, element 52 and disk 55 away from the cam disk 38. The index disk 55 is provided at its periphery with notches 60 and a notch 61 which is wider than notches 60, which notches are engaged by wheel 65, slidably mounted on shaft 66 in arm 67 fulcrumed at 68 to casing 1. Said wheel is maintained in contact with the periphery of said disk and in engagement with said notches by the action of spring 70, which spring is connected at its respective ends to arm 67 and to pin 57. A lug 76 secured to the casing 1 is provided with a projection 76' which normally rests under the disk 55 and prevents said disk from being moved to project the lugs 40 and 41 through the slots in any of the disks 50, 51, and 55 until the complete combination of the lock is established. The index disk 55 is also provided at its periphery with a notch 75 which is adapted to register with lug 76 when the lock combination is established and the lug 40 registers with slots 42, 44, 46, and 53, and the lug 41 registers with the slots 43, 45, 47, and 54, so that the disks 50 and 51, element 52, and disk 55 may be drawn toward disk 38 against the tension of spring 58 and the lugs 40 and 41 projected through said slots to clutch the stud 35 to the cam 37. The edge of the index disk 55 is adapted to rest against said projection 76′ when the disks 50 and 51, element 52, and disk 55 are drawn toward cam disk 38, the lug 40 projected through the slots 42, 44, 46, and 53, the lug 41 projected through the slots 43, 45, 47, and 54, and the disks turned to prevent the cam from being unclutched from the stud. The disk 50 is provided with a segmental slot 80 into which projects a pin 81 from disk 51. The disk 51 is provided with a segmental slot 82 into which projects a pin 83 from the index disk 55, the disk 52 being provided with an opening 84 to permit pin 83 to project from the index disk into the slot 82 in disk 51. The slots 46 and 47 in disk 52 are segmental in form to permit turning of the lugs 40 and 41 therein, and are of such length as to limit the turning movement of said lugs, cam disk 38 and cam 37, when the pawls 18 and 19 and the pawls 20 and 21 are disengaged from the teeth of the segments 14 and 15 by said cam.

The operation is as follows: Assume the lock to be unlocked from the vehicle wheel with the arms 10 and 11 spread apart in unlocking position the arms locked in said unlocking position by the engagement of pawls 20 and 21 with the teeth of segments 14 and 15, with the disks 50 and 51, element 52, and disk 55 forced away from disk 38 by spring 58 and the combination of the lock to be lost. To lock the wheel of the vehicle, the hand wheel 36 of the lock is first turned to the right until the various elements determining the lock combination are brought to their initial position or zero. This condition of the lock combination is established when the disks 50, 51, and 55 have been turned to the right in unison with each other, by the engagement of pin 83 with the end of the slot 82, and by the engagement of pin 81 with the end of slot 80 until the roller 65 is brought into engagement with notch 61 in index disk 55. This condition of the lock is illustrated in Fig. 8 of the drawing.

The person who understands and operates the lock knows when the roller 65 engages the notch 61 in disk 55, and that he has established zero in the lock combination by feeling with his fingers a slight free turning movement of the handle to right or left, which is permitted by the notch 61 inasmuch as the size of said notch is such as to permit the disk 55 to turn slightly in either direction without the roller 65 disengaging said notch and springing into one of the notches 60. The lock combination as disclosed in the present embodiment of my invention when zero has been established, is as follows:

27 to right,
14 to left,
1 to right, but it is to be understood that the combination may be varied within the scope of the invention. Each of the notches 60 in the index disk 55 represents a unit in the combination and as soon as zero has been established, the operator turns the handle to the right until the roller 65 engages the 27th notch 60 to the left of notch 61. This condition of the combination places the slots 42 and 43 in registration with lugs 40 and 41 respectively, which condition is illustrated in Fig. 13 of the drawing.

The operator is able to count the units in the combination as he turns the handle, by feeling with his fingers, the holding action of the roller 65 upon the disk 55 each time the roller 65 engages a notch 60. It will thus be seen that the operator determines the combination of the lock entirely by the sense of touch.

When the handle 36 has been turned 27 units to the right, the operator then turns the handle to the left until the roller 65 engages the 14th notch 60 to the right of said 27th notch. This condition of the combination places the slots 44 and 45 of disk 51 in registration with lugs 40 and 41 respectively, which condition is illustrated in Fig. 15 of the drawing. The operator then turns the handle to the right until the roller 65 engages the first notch 60 to the left of said 14th notch, which brings the slots 53 and 54 of disk 55 into registration with lugs 40 and 41 and the notch 75 of said disk into register with projection 76′ of the lug 76, which condition is illustrated in Fig. 17 of the drawing. The combination of the lock is then established and the handle 36 is pulled outwardly from the casing 1, drawing the disks 50 and 51, element 52, and disk 55 toward the cam disk 38 against the tension of the spring 58 and projecting the lug 40 through slots 42, 44, 46, and 53, and lug 41 through slots 43, 45 47, and 54 in said disks and element and projecting the lug projection 76′ through the notch 75 in disk 55 until the disk 55 rests under said projection 76′. The cam 37 is now clutched with the stud 35 through the medium of lugs 40 and 41, slots 53 and 54, and disk 55, and the handle is then turned to the left until the cam 37 elevates the foot 25, which in turn disengages the pawls 20 and 21 from the teeth of the segments 14 and 15. As soon as the pawls 20 and 21 disengage the teeth of said segments, the turning of the handle and cam 37 is arrested by the engagement of lugs 40 and 41 with the ends of slots 46 and 47 respectively in disk 52, as shown in Fig. 20 of the drawing. The operator then closes the arms 10 and 11 or turns them on their fulcrums toward each other, the pawls 18 and 19 alternately escaping the teeth of the segments 14 and 15 to permit such movement of the arms 10 and 11, until the arms are brought into locking position and the vehicle wheel is locked against rotation, as illustrated in full lines in Fig. 1 of the drawing. The operator then turns the handle to the right until the notch 75 in the disk 55 is brought back into registration with lug 76 and releases the handle, whereupon the spring 58 forces the disks 50 and 51, element 52, and disk 55 away from cam disk 38 and the notch 75 of disk 55 out of engagement with lug 76. The handle is then turned in any way to lose the combination of the lock and the arms 10 and 11 of the lock are locked in locking position and the wheel of the vehicle securely locked against rotation.

To unlock the lock and the wheel of the vehicle, the handle 36 is first turned until zero and the numbers of the combination are established in order. The disks 50 and 51, element 52, and disk 55 are drawn toward cam disk 38 until the disk 55 rests under lug projection 76'. The handle 36 is then turned to the right until the cam 37 disengages the pawls 18 and 19 from the teeth of the segments 14 and 15. The cam is arrested in this position and the pawls 18 and 19 out of engagement with the teeth of the segments 14 and 15 by the engagement of the lugs 40 and 41 with the ends of slots 46 and 47 in disk 52, as illustrated in Fig. 21 of the drawing. The arms 10 and 11 are then turned away from each other on their fulcrums, the pawls 20 and 21 escaping the teeth of segments 14 and 15 to prevent such movement of the arms until they unlock the vehicle wheel. The arms 10 and 11 may be locked when spread apart in unlocking position by turning the handle 36 to the left until the cam 37 disengages the pawls 18 and 19 and the notch 75 of the disk registers with lug 76 and the spring 58 forces the disks 50, 51, 52, and 55 away from cam disk 38 and the disk 55 beyond the lug 76 and by losing the combination of the lock lost as above described.

What I claim is:

1. In a lock, a pair of locking arms, a toothed segment on each of said arms the teeth of which mesh with each other, a dog engaging the teeth of each of said segments to lock said arms, a foot engaging said dogs, means for engaging said foot to disengage said dogs from said teeth to release said arms, and means for actuating said foot engaging means.

2. In a lock, a locking element, locking means for locking said locking element, an unlocking member adapted to unlock the locking means, a lug coöperating with the unlocking member, a disk provided with a slot through which said lug is adapted to project, the end of said slot being adapted to arrest the movement of said lug and said unlocking member when said unlocking member has unlocked said locking means from said locking element.

3. In a lock correspondingly movable locking arms, being free from connection with one another, and means to lock said arms in a plurality of positions between their extent of movement in either direction.

4. In a combination lock, a locking element, locking means for said locking element, and an unlocking member for unlocking said locking means, a clutch connecting element on said unlocking member, a second clutch connecting element comprising a pair of disks, one of said disks being provided with a slot, a pin on the other disk projecting into said slot, means for turning one of the disks so that the pin will engage the end of the slot in the other disk, and for bringing said disks into connection with the connecting element and for actuating said disks, clutch elements and unlocking member to unlock said locking means.

5. In a combination lock, a locking element, means for locking said locking element, an unlocking member, a clutch connecting element on said unlocking member, a second clutch connecting element, and means to bring the second named clutch element into connection with the clutch element on said unlocking member whereby the clutch members will coöperate and said unlocking member is actuated.

6. In a lock, a locking element, means for locking said locking element, an unlocking member, a disk rotated by said unlocking member, said disk being provided with a notch, a lug on the lock casing adapted to rest under the edge of the disk when said disk is unclutched from said unlocking member to prevent clutching of said disk with said unlocking member, and means for rotating said disk to bring the notch into register with the lug to permit clutching of said disk with said unlocking member, said disk adapted to be turned while clutched by said rotating means to cause said unlocking member to unlock said unlocking means.

7. In a lock a locking element, locking means therefor, an unlocking member, a clutch member on said unlocking member, a second clutch member comprising rotatable disks and a non-rotatable disk between said rotatable disks, one of said rotatable disks having a slot therein, said non-rotatable disk having a slot therein communicating with the slot in said rotatable disk, a pin on the other rotatable disk extending into the slots in said rotatable and non-rotatable disks, the slot in said non-rotatable disk being longer than the slot in the rotatable disk, and means for rotating one of said rotatable disks to cause said second clutch to coöperate with the first clutch and actuate the unlocking member.

8. In a lock, a locking element, an unlocking member, a clutch carried by said unlocking member, a second clutch consisting of rotatable disks, a non-rotatable disk arranged between said rotatable disks, and means to rotate said rotatable disks to cause the second clutch to coöperate with the first clutch and the unlocking member to actuate.

9. In a lock, a supporting means correspondingly movable locking arms pivoted independently of one another upon the supporting means at certain ends and being free from connection with one another at their other ends, and means to lock said arms in a plurality of positions between their extent of movement in either direction.

In testimony whereof, I have hereunto set my hand at Los Angeles, California, this 30th day of March 1914.

PAUL PALÉ.

In presence of—
ALAN FRANKLIN,
LORRAINE E. DURROW.

Copies of this patent may be obtained for five cents each, by addressing the "Commissioner of Patents, Washington, D. C."